April 8, 1924.

S. H. LOUGHMAN 1,489,259

BUMPER ATTACHMENT FOR AUTOMOBILES

Filed Nov. 17, 1922

INVENTOR
STEPHEN H. LOUGHMAN
By Christahl Parker Carlson
ATTYS.

Patented Apr. 8, 1924.

1,489,259

UNITED STATES PATENT OFFICE.

STEPHEN H. LOUGHMAN, OF CHICAGO, ILLINOIS.

BUMPER ATTACHMENT FOR AUTOMOBILES.

Application filed November 17, 1922. Serial No. 601,476.

*To all whom it may concern:*

Be it known that I, STEPHEN H. LOUGHMAN, a citizen of the United States, residing at Chicago, in the county of Cook and State of Illinois, have invented a certain new and useful Bumper Attachment for Automobiles, of which the following is a specification.

This invention relates generally to bumpers for automobiles and the like and has special reference to improved means for the attachment of bumpers to such vehicles.

In certain makes of cars there is no convenient means at the rear end for attachment of bumpers having the usual forms of supporting brackets as, for example where no rear fuel tank is provided having the usual supporting brackets upon which bumper brackets might be fastened or where a spare tire or wheel carrier on the back of the car projects to such an extent that the ordinary forms of bumper brackets cannot be employed even through an otherwise satisfactory support for the attachment of a bumper is afforded by tank brackets or projecting portions of the chassis. It is one of the principal objects of the present invention to provide a convenient means for the attachment of a bumper in such cases.

Another object of the invention is to provide an advantageous arrangement in the mounting of the rear bumper relative to the spare tire or wheel carrier on the back of the car whereby the bumper is made to serve to prevent the theft or loss of the tire or wheel mounted on the carrier.

Figure 1:
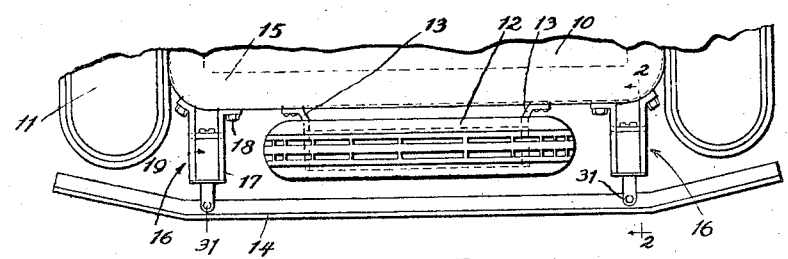
Figure 2:
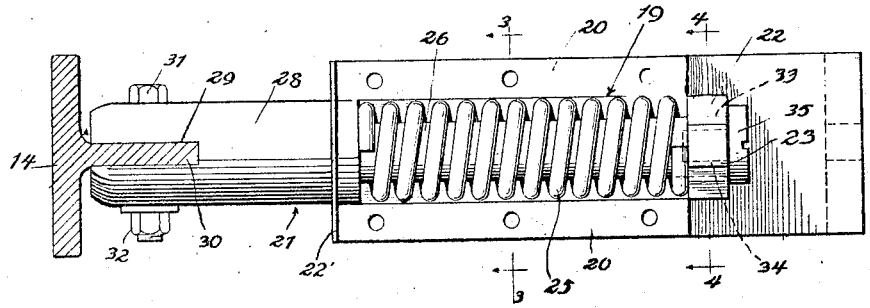
Figure 3:
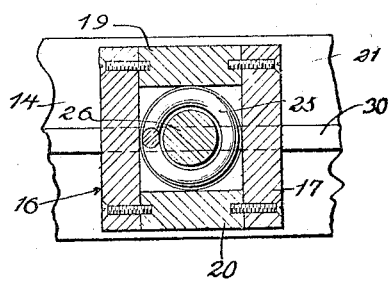
Figure 4:
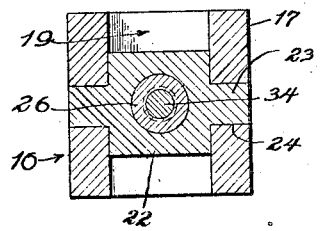

Other special objects of the invention will appear in the course of the following detailed description thereof. Reference is made to the accompanying drawing forming a part hereof, wherein Figure 1 is a fragmentary plan view of the rearward portion of an automobile having a bumper attached in accordance with the invention. Fig. 2 is a side elevation of one of the bumper supports with a part thereof removed to disclose the internal construction thereof, the view being taken on the line 2—2 of Fig. 1 looking in the direction indicated by the arrows. Fig. 3 is a transverse vertical sectional detail taken on the line 3—3 of Fig. 2, and Fig. 4 is a similar detail on the line 4—4 of Fig. 2, both views being taken looking in the directions indicated by the arrows.

In the drawing the reference numeral 10 is applied to the body of the automobile, only the rearward portion of which appears. Portions of the rear fenders 11 are also shown. In the types of cars to which the present invention is adapted for application, of which the Saxon automobile is an instance, either there is no rear tank supported on brackets which might serve as a convenient means for the attachment of the bumper brackets, or else, as in the case illustrated, a spare tire or wheel 12 is mounted on supporting brackets 13 and projects to such an extent that the rear bumper 14 could not be secured in the usual manner by fastening the supporting brackets thereof either to the tank brackets, where a tank is provided, or directly to the chassis frame, a portion of which is indicated in dotted lines at 15. In such cases the spare tire or wheel on the brackets 13 which constitute a carrier therefor is frequently made to serve the purpose of a bumper to a certain extent. As a consequence, in the event of a collision, costly damage results either to the fenders or the body which are not protected properly by the tire or wheel on the carrier or the latter itself frequently is damaged considerably. In cases where rear tanks are provided there is the additional hazard of the tank being stove in. I have provided a bumper attachment whereby the same is supported directly upon the chassis preferably, the same comprising means constituting extensions from the chassis to the bumper serving to support the bumper in spaced relation to the carrier beyond the same and having preferably suitable shock absorbing means forming part of the extensions as will hereinafter appear.

The bumper supports comprise a pair of brackets 16 disposed on opposite sides of the carrier and projecting preferably beyond the same. The brackets, while they may be of any suitable or desired form, are conveniently made of plates 16 and 17 with bent angular ends arranged to be rigidly bolted as at 18 to the chassis frame. The plates 16 and 17 form the sides of housings 19, the upper and lower walls of which are provided by plates 19 and 20 extending between the plates 16 and 17 and fastened thereto suitably by means of screws 21 as shown. A rear wall 22 is provided by a plate having square lugs 23 engaging in square sockets 24 in the side walls of the housing provided by the plates 16 and 17. A front wall 22' is provided with an apertured plate fastened suitably by screws or the like to the plates 16, 17 and 19 and 20. The wall 22 serves as an abutment for a compression spring 25 which surrounds the inner reduced end 26 of a plunger rod 27 and engages an annular shoulder provided by the enlarged outer end 28 thereof. The extremity of the enlarged portion 28 is conveniently slotted as at 29 to receive the horizontal flange 30 of the bumper bar 14 which is conveniently T-shaped. A bolt 31 having a nut 32 threaded on its lower end passes vertically through the plunger rod 27 to secure the bumper thereto. The purpose in providing the nut on the lower end of the bolt is to avoid making the same too readily accessible for a thief in the event an attempt is made to loosen the bumper bar. Any desired form of special fastening may be used in this connection as a protection against unauthorized removal of the bumper bar. The inner end of the plunger rod passes through an opening 33 in the wall 22 of the housing and receives in a socket 34 provided therein, a screw 35 having an enlarged fillister head which serves as a stop for limiting the outward movement of the plunger rod. The inward movement of the plunger rods is, of course, restrained by the compression of the springs 25. To permit such inward movement the bumper 14 mounted on the ends of the rods is spaced sufficiently from the carrier on the back of the car. I prefer to have the brackets 16 or the plunger rods 27 of such lengths that the space between the bumper and the carrier will be slightly too small to afford clearance for the removal or coming off of the spare tire or wheel on the carrier. In this way the theft thereof or chance coming off is prevented. For the purpose, however, of permitting the removal of the tire or wheel when the occasion requires, the bumper is arranged to be detached from the plunger rods by removing one or both of the bolts 31. Or more conveniently, the bumper may be detached from connection with one of the plunger rods at one end and swung in a vertical plane about the other rod as a pivot out of the way of the carrier and thus afford the driver easy access to the tire or wheel for the removal thereof. It is conceivable, too, that the space between the bumper and the tire or wheel on the carrier may be such that the bumper may simply be detached at one end from connection with one of the plunger rods and swung horizontally outwardly to afford clearance for the removal of the tire from the carrier.

From the foregoing description it will appear that I have provided a very practical and serviceable attachment for a bumper especially in the particular cases hereinbefore mentioned; also, that I have provided a simple and cheap accessory of this kind which, besides serving its function as a bumper is adapted to serve conveniently for the prevention of the theft or loss of the spare tire or wheel from the carrier usually provided on automobiles.

I claim as my invention:

1. The combination in an automobile of a bumper and brackets serving as a support for the attachment of the bumper, each of said brackets comprising a pair of spaced relatively long bars each having one end bent for attachment to the body of the automobile, a pair of spaced relatively short bars positioned between said first mentioned bars to form a housing, transversely extending plates mounted on the end of said relatively short bars to form end walls of the housing, a rod mounted in said housing and reciprocally movable relative thereto, said rod having one end projecting through the outer end wall of said housing, and the other end projecting through the inner end wall of said housing, a member mounted on the projecting inner end of the rod, said member being adapted as a stop to limit the outward movement of said rod, a coiled compression spring mounted in the housing and encircling said rod with one end bearing against the inner end wall of the housing and the other bearing against a shoulder formed on said rod to yieldingly hold the rod in its normal outer position, and means for detachably connecting said bumper to the outer end of said rod.

2. The combination in an automobile of a bumper, and means on the automobile arranged to serve as a support for the attachment of said bumper but situated remote therefrom, and said automobile having a spare tire or wheel carrier or the like between said support and said bumper, of a pair of brackets on opposite sides of said carrier rigidly secured on said support and constituting extensions therefrom for said bumper beyond said carrier, plunger rods extending beyond said brackets for connection to said bumper and movable in guides inwardly in said brackets, and coiled compression springs in said brackets fitting around said rods and acting between the rods and the brackets to absorb the shock of collision.

3. The combination in an automobile of a bumper, and means on the automobile arranged to serve as a support for the attachment of said bumper but situated remote therefrom, and said automobile having a spare tire or wheel carrier or the like between said support and said bumper, of a pair of brackets on opposite sides of said carrier rigidly secured upon said support and forming extensions therefrom for said bumper beyond said carrier, and resilient means mounted on the brackets, said bumper being detachably fastened to said resilient means and positioned adjacent and disconnected from said carrier, and adapted, by reason of its position, to prevent loss or unauthorized removal of articles mounted on the carrier.

4. The combination in an automobile of a bumper and means on the automobile serving as a support for the attachment of the bumper but situated remote therefrom, and said automobile having a spare tire or wheel carrier or the like between the said support and bumper, of a pair of brackets upon opposite sides of said carrier rigidly secured to the support and constituting extensions therefrom to the bumper beyond the carrier, plunger rods in said brackets arranged for slight reciprocatory movement therein and having impact cushioning means, said bumper being connected to said bars in slightly spaced relation to said carrier to allow for a certain amount of inward movement of the bumper with the plungers in the event of a collision, said space being insufficient to provide clearance for the removal or coming off of the tire or wheel on the carrier, and said bumper being detachably mounted on said plunger rods to permit the removal of said tire or wheel when the occasion requires.

5. The combination in an automobile of a bumper and means on the automobile serving as a support for the attachment of the bumper but situated remote therefrom, and said automobile having a spare tire or wheel carrier or the like between the said support and bumper, of a pair of brackets upon opposite sides of said carrier rigidly secured to the support and constituting extensions therefrom to the bumper beyond the carrier, and plunger rods mounted in said brackets for supporting said bumper in slightly spaced relation to said carrier for the protection of the latter and the automobile as well as in the event of a collision, the said space being insufficient to permit the removal or coming off of the tire or wheel on the carrier, the said connections between the bumper and plunger rods being arranged to permit detaching the bumper from one of said rods and swinging the same on the other rod as a pivot out of the way of the carrier to permit the removal of the tire or wheel therefrom when the occasion requires.

6. The combination in an automobile of a bumper and means on the automobile serving as a support for the attachment of the bumper but situated remote therefrom, and said automobile having a spare tire or wheel carrier or the like between the said support and bumper, of a pair of brackets upon opposite sides of said carrier rigidly secured to the support and constituting extensions therefrom to the bumper beyond the carrier, and plunger rods rotatably mounted in said brackets for supporting said bumper in slightly spaced relation to said carrier for the protection of the latter and the automobile as well in the event of a collision, the said space being insufficient to permit the removal or coming off of the tire or wheel on the carrier, the said connections between the bumper and plunger rods being arranged to permit detaching the bumper from one of said rods and swinging the same with the other rod as a pivot vertically out of the way of the carrier to permit the removal of the tire or wheel therefrom when the occasion requires.

In testimony whereof, I have hereunto affixed my signature.

STEPHEN H. LOUGHMAN.